No. 798,373. PATENTED AUG. 29, 1905.
E. M. WHEELOCK.
TENDER.
APPLICATION FILED DEC. 19, 1903.

Witnesses,
W. H. Palmer
Emily T. Otis

Inventor,
Edwin M. Wheelock.
by Lothrop Johnson
his Attorneys.

UNITED STATES PATENT OFFICE.

EDWIN M. WHEELOCK, OF WATERTOWN, SOUTH DAKOTA, ASSIGNOR OF THREE-FOURTHS TO SEVERIN N. SORENSEN, OF MINNEAPOLIS, MINNESOTA.

TENDER.

No. 798,373.     Specification of Letters Patent.     Patented Aug. 29, 1905.

Application filed December 19, 1903. Serial No. 185,877.

*To all whom it may concern:*

Be it known that I, EDWIN M. WHEELOCK, a citizen of the United States, residing at Watertown, in the county of Coddington and State of South Dakota, have invented certain new and useful Improvements in Tenders, of which the following is a specification.

My invention relates to improvements in engine-tenders, its object being to provide a tender which will be automatically guided in the backing up of the engine and which can also be quickly and easily uncoupled from the engine.

To this end my invention consists in the features of construction and combination hereinafter particularly described and claimed.

Figure 1:
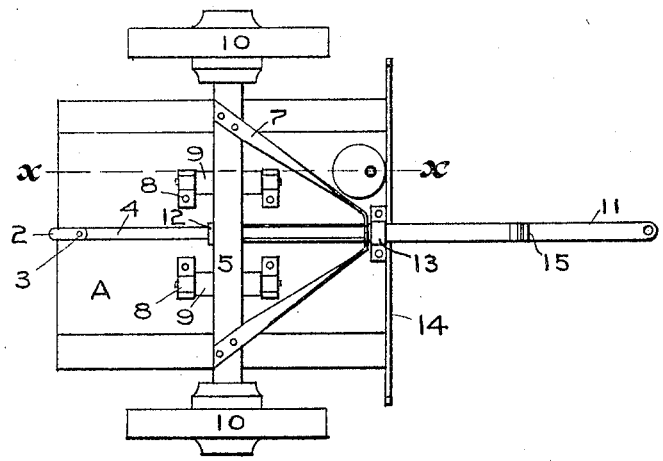
Figure 2:
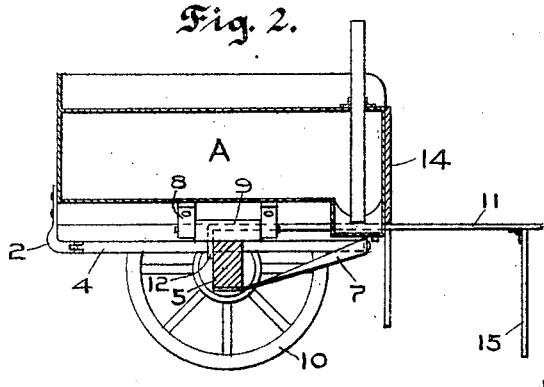
Figure 3:
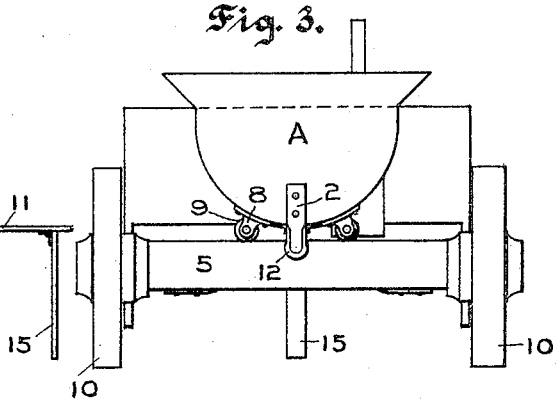

In the accompanying drawings, forming part of this specification, Figure 1 is a bottom view of my improved tender. Fig. 2 is a section on line *x x* of Fig. 1, and Fig. 3 is a rear elevation of the tender.

In the drawings, A represents the tank of the tender, which may be of any desired construction. The tank is supported at its rear end upon a bracket 2, which is connected by a vertical pivot 3 with a bar 4, the forward end of said bar being suitably connected with the axle 5, as by means of straps 7. Journaled in brackets 8, secured to the under side of the tender-tank, are rollers 9, which rest upon the axle 5. Suitable wheels 10 are mounted upon the ends of the axle.

The tender is connected with the engine (not shown) by means of the tongue or catch 11 and adapted to be suitably coupled at its free end with the engine. The opposite end of the tongue is formed with a loop 12, inclosing the bar 4. The tongue slides through a suitable guide 13, secured under the forward end of the tank. To the front of the tank is secured a suitable tail-board 14. A suitable leg 15 is hinged to the free end of the tongue to rest upon the ground and to support said tongue when the tender is disconnected from the engine.

In use the tongue will be pulled forward, as shown in Fig. 1, and coupled to the engine. In this position of the parts the loop upon the rear end of the tongue will inclose the bar 4 adjacent to the axle and prevent relative turning of the axle and tank. When the engine is backed, the tongue will be first shoved to the rear until the loop 12 passes the pivot 3, when the bar 4 will be free to turn upon said pivot. The continued backing of the engine will cause it to bear against the tail-board 14, pushing the tender back with the engine. As the engine is turned the wheels of the tender will likewise turn through the medium of the pivotal connection 3, thus properly guiding the wheels of the tender. As the wheel-axle turns upon the pivot 3 the rollers 9 will run upon the axle. When the engine is again moved forward, the tongue will be carried into the forward position, (shown in Fig. 1,) again locking the tank and wheel-axle. In this position the guide 13, carried by the tender-tank, and the loop 12, which incloses the bar 4, will prevent any relative turning of the tank and wheel-axle.

Having now described my invention, what I claim as new, and desire to secure by Letters Patent, is—

1. A tender for engines comprising in combination an axle and supporting-wheels, a tank supported to turn in a horizontal plane above said axle, means for locking said tank against turning when the same is being drawn forward and for allowing said tank to turn upon its pivot when the tank is pushed rearwardly.

2. A tender for engines comprising in combination an axle, wheels journaled thereon, framework carried by said axle, a tank pivotally supported upon said axle, means slidably arranged in connection with said tank and framework to lock the same against relative turning when drawn forward, and to allow relative turning of the tank and axle when pushed rearwardly.

3. A tender for engines comprising in combination an axle, wheels journaled thereon, a tank pivotally supported upon said axle, a tongue slidably supported under said tank, and means locking said tank and axle against relative turning when the tongue is drawn forward and permitting relative turning when the tongue is forced rearwardly.

4. A tender for engines, comprising in combination an axle, wheels journaled thereon, a horizontal bar carried by said axle, a tank, framework supporting said tank, said framework being connected to said horizontal bar by a vertical pivot, and a tongue slidably supported under said tank and carrying a loop inclosing said horizontal bar, as and for the purpose set forth.

5. A tender for engines, comprising in combination an axle, wheels journaled thereon, a tank, a downwardly-extending bracket secured to one end of said tank, a horizontal bar supported by said axle, a vertical pivot connecting said bracket and bar, a guide carried by the opposite end of said tank, and a tongue sliding through said guide and slidably connected with said horizontal bar and tank-supporting bracket, as and for the purpose set forth.

In testimony whereof I affix my signature in presence of two witnesses.

EDWIN M. WHEELOCK.

Witnesses:
 H. S. JOHNSON,
 EMILY F. OTIS.